(12) United States Patent
Devine et al.

(10) Patent No.: US 10,975,222 B2
(45) Date of Patent: Apr. 13, 2021

(54) ORGANIC MATERIAL

(71) Applicant: Altro Limited, Letchworth Garden City (GB)

(72) Inventors: Edward James Devine, Letchworth Garden City (GB); Richard John Peace, Letchworth Garden City (GB); Shireen Bobat, London (GB)

(73) Assignee: Altro Limited, Letchworth Garden City (GB)

( * ) Notice: Subject to any disclaimer, the term of this patent is extended or adjusted under 35 U.S.C. 154(b) by 30 days.

(21) Appl. No.: 16/225,906

(22) Filed: Dec. 19, 2018

(65) Prior Publication Data

US 2019/0194420 A1    Jun. 27, 2019

(30) Foreign Application Priority Data

Dec. 21, 2017   (GB) ...................... 1721562

(51) Int. Cl.
| | |
|---|---|
| *C08K 5/12* | (2006.01) |
| *C08K 5/11* | (2006.01) |
| *C08J 3/18* | (2006.01) |
| *C08L 27/06* | (2006.01) |
| *C08K 5/00* | (2006.01) |

(52) U.S. Cl.
CPC ............... *C08K 5/12* (2013.01); *C08J 3/18* (2013.01); *C08K 5/11* (2013.01); *C08L 27/06* (2013.01); *C08J 2327/06* (2013.01); *C08K 5/0016* (2013.01); *C08K 2201/014* (2013.01); *C08L 2203/16* (2013.01); *C08L 2203/18* (2013.01)

(58) Field of Classification Search
None
See application file for complete search history.

(56) References Cited

U.S. PATENT DOCUMENTS

| | | | |
|---|---|---|---|
| 4,824,893 A * | 4/1989 | Hull ..................... | C08K 5/11 |
| | | | 524/310 |
| 5,556,905 A * | 9/1996 | Frappier ............... | C08K 5/11 |
| | | | 524/311 |
| 7,276,621 B2 | 10/2007 | Cook et al. | |
| 7,452,927 B2 | 11/2008 | Hayes | |
| 7,629,413 B2 | 12/2009 | Godwin et al. | |
| 7,741,395 B2 | 6/2010 | Holt et al. | |
| 7,964,658 B2 | 6/2011 | Grass | |
| 7,973,194 B1 | 6/2011 | Kinkade et al. | |
| 8,084,534 B2 | 12/2011 | Gosse et al. | |
| 8,163,825 B2 | 4/2012 | Colle et al. | |
| 8,329,796 B2 | 12/2012 | Grass | |
| 8,431,638 B2 | 4/2013 | Grass et al. | |
| 8,669,311 B2 | 3/2014 | Colle et al. | |
| 9,017,785 B2 | 4/2015 | Ko et al. | |
| 9,085,669 B2 | 7/2015 | Dakka et al. | |
| 9,133,321 B2 | 9/2015 | Becker et al. | |
| 9,139,505 B2 | 9/2015 | Turner et al. | |
| 9,175,148 B2 | 11/2015 | Becker et al. | |
| 9,249,582 B1 | 2/2016 | Anspach et al. | |
| 9,309,183 B2 | 4/2016 | Storzum et al. | |
| 9,346,965 B2 | 5/2016 | Becker et al. | |
| 9,365,695 B2 | 6/2016 | Godwin et al. | |
| 9,375,753 B2 | 6/2016 | Laukhuff et al. | |
| 2010/0310891 A1 | 12/2010 | Godwin | |
| 2011/0021680 A1 | 1/2011 | Colle et al. | |
| 2011/0046283 A1 * | 2/2011 | Grass ................... | C07C 69/704 |
| | | | 524/285 |
| 2011/0206901 A1 | 8/2011 | Bushey et al. | |
| 2013/0317152 A1 | 11/2013 | Becker et al. | |
| 2014/0088226 A1 | 3/2014 | Gevers et al. | |
| 2014/0147585 A1 | 5/2014 | Smith | |
| 2014/0343204 A1 | 11/2014 | Naert et al. | |
| 2015/0112008 A1 | 4/2015 | Patil et al. | |
| 2015/0175764 A1 | 6/2015 | Lensbouer et al. | |
| 2015/0184399 A1 | 7/2015 | Davies et al. | |
| 2015/0259498 A1 | 9/2015 | Neumann et al. | |
| 2016/0075855 A1 | 3/2016 | Funderburg et al. | |

(Continued)

FOREIGN PATENT DOCUMENTS

| | | |
|---|---|---|
| AU | 2014361364 A | 6/2016 |
| CN | 104109324 A | 10/2014 |

(Continued)

OTHER PUBLICATIONS

Search Report issued for GB1721562.5, dated Apr. 25, 2018.
Freedom to Operate Search Report, dated Sep. 16, 2016.

*Primary Examiner* — Robert T Butcher
(74) *Attorney, Agent, or Firm* — Westman, Champlin & Koehler, P.A.; Z. Peter Sawicki; Amanda M. Prose

(57) ABSTRACT

The invention provides a plasticiser composition which comprises: (a) a first plasticiser which is one or more compounds of general formula (I)

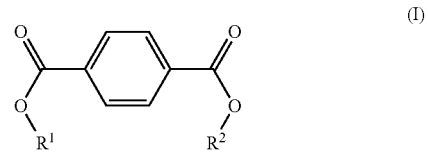

wherein $R^1$ and $R^2$ each independently represent a straight or branched chain alkyl moiety comprising from seven to twelve carbon atoms; and (b) a second plasticiser which is a citrate ester; a plasticised polymer formulation comprising a polymer and the plasticiser composition; a plastics article comprising the plasticised polymer formulation; and a method for the preparation of the plasticiser composition to provide a plasticised polymeric formulation which can be stored for up to five weeks with an increase of viscosity of less than 300%.

21 Claims, No Drawings

(56) References Cited

U.S. PATENT DOCUMENTS

| | | | |
|---|---|---|---|
| 2016/0075890 A1 | 3/2016 | Funderburg et al. | |
| 2016/0215119 A1 | 7/2016 | Wagner et al. | |
| 2016/0230399 A1 | 8/2016 | Zhang et al. | |
| 2016/0237243 A1 | 8/2016 | Woldt et al. | |
| 2016/0237244 A1 | 8/2016 | Boeck et al. | |
| 2016/0326346 A1* | 11/2016 | Gourdin | C08K 5/11 |
| 2018/0265672 A1* | 9/2018 | Kim | C08L 23/12 |

FOREIGN PATENT DOCUMENTS

| | | |
|---|---|---|
| CN | 106280063 A | 1/2017 |
| CN | 106280067 A | 1/2017 |
| EP | 2001683 B | 1/2010 |
| EP | 2308677 B | 12/2013 |
| EP | 2726545 A | 5/2014 |
| EP | 2810932 A1 | 12/2014 |
| EP | 2889137 A | 7/2015 |
| EP | 2955013 A | 12/2015 |
| EP | 3059222 A | 8/2016 |
| EP | 3255086 A1 | 12/2017 |
| FR | 3012815 A | 5/2015 |
| KR | 20160112443 A | 9/2016 |
| WO | 2009/085453 A2 | 7/2009 |
| WO | 2015/072741 A1 | 5/2015 |
| WO | 15063189 A | 5/2015 |
| WO | 15082676 A | 6/2015 |
| WO | 15101569 A | 7/2015 |
| WO | 15104309 A | 7/2015 |
| WO | 15158595 A | 10/2015 |
| WO | 15158596 A | 10/2015 |
| WO | 15162079 A | 10/2015 |
| WO | 16005357 A | 1/2016 |
| WO | 16055572 A | 4/2016 |
| WO | 16055573 A | 4/2016 |

* cited by examiner

ORGANIC MATERIAL

The present invention relates to a plasticised polymeric formulation comprising dioctyl terephthalate (DOTP) and plastic articles formed from the formulation, particularly flooring.

Popular polymeric materials such as polyvinylchloride (PVC) are hard and brittle at ambient temperatures and require the addition of further materials such as plasticisers to be usable. Typically, an ortho-phthalate has been used as a plasticiser.

Due to concerns about their toxicity, there is a general move away from using ortho-phthalate plasticisers in plastic formulations. There is particular concern about the use of such phthalate plasticisers in flooring due to their close consumer contact and their impact on indoor air quality. As such phthalates have been used for such a long time as plasticisers in consumer products, expectations of the performance of plasticised formulations and plastic products are driven by the properties of phthalates in terms of workable lifetime of the formulations and the flexibility of the products.

The replacement of phthalate plasticisers presents formulators with considerable challenges. Terephthalates have not been widely used due to their poor compatibility with PVC, making them a poor alternative to ortho-phthalates. Problems encountered by formulators include plasticiser exudation, increased processing energy, poor processability. In the August 2017 edition of Compounding World, the solution to these problems was said to be to use a plasticiser formulation comprising DOTP and a dibenzoate.

In WO2009/085453, it is disclosed that as an ortho-phthalate free plasticiser to plasticise a polymer composition, a combination of fast fusing and slow fusing plasticisers can be used to provide a plastisol having low viscosity, improved viscosity stability and improved processability. It teaches that the fast fusing plasticiser can be selected from fast fusing esters based on di-butyl terephthalates, C8-C10 mono benzoates, dibenzoates esters of ethylene glycol or dipropylene glycol, C4-C7 cyclohexanoates, alkyl sulfonic acid esters of phenol, aliphatic dibutyrate esters, or citrate esters; and that the slow fusing plasticiser is an ester of cyclohexanecarboxylic acids, in particular the 2-ethylhexanol ester of 1,2 cyclohexanedicarboxylic acid (known as DINCH).

A way of ameliorating these problems has been sought.

According to the invention there is provided a plasticiser composition which comprises:
  (a) a first plasticiser which is one or more compounds of general formula (I)

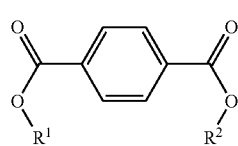

wherein $R^1$ and $R^2$ each independently represent a straight or branched chain alkyl moiety comprising from seven to twelve carbon atoms; and
  (b) a second plasticiser which is a citrate ester.

According to the invention there is further provided a plasticised polymer formulation which comprises a polymer and a plasticiser composition according to the invention.

According to the invention there is also provided a plastics article comprising a polymer, and a plasticiser composition according to the invention.

According to the invention there is further provided use of a plasticiser composition according to the invention to provide a plasticised polymeric formulation which can be stored for up to five weeks with an increase of viscosity of less than 300%.

Advantages of the invention include that the plasticiser composition is suitable for industrial use as it has surprisingly been found that the plasticised formulation can be stored for up to five weeks before use at different temperatures without a significant degradation of its properties. When a plasticiser composition is used in an industrial process, it is common for a large batch to be made and then stored in the factory prior to its use. If a batch becomes too viscous during storage to be used, a lot of time and money can be wasted in shutting down a production line to clean supply lines and storage containers. Also, there are additional waste costs in discarded composition and its disposal. Use of the composition or formulation according to the invention minimises this risk because its properties are less dependent upon fluctuations in temperature compared to the known combinations of DOTP and a dibenzoate or of DINCH and a citrate ester. The composition and formulation according to the invention are suitable for use in sensitive application sectors, such as medical products, packaging for food and drink, products for use in enclosed environments such as in vehicles or buildings.

Furthermore, the plasticised formulation has a gelation speed which is suitable for it to be used in an industrial production line.

In some embodiments, in general formula (I) $R^1$ and $R^2$ may each independently represent a straight or branched chain alkyl moiety comprising from seven to twelve carbon atoms which may be n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl alkyl moiety. In some embodiments, in general formula (I) $R^1$ and $R^2$ may each independently represent a n-octyl, n-nonyl, isononyl, 2-ethylhexyl, isodecyl, 2-propylheptyl, n-undecyl, or isoundecyl alkyl moiety.

In some embodiments, in general formula (I) $R^1$ and $R^2$ may each independently represent a straight or branched chain alkyl moiety comprising from seven to nine carbon atoms, for example eight carbon atoms. In some embodiments, in general formula (I) $R^1$ and $R^2$ may each represent a 2-ethylhexyl alkyl moiety.

In some embodiments, in general formula (I) $R^1$ and $R^2$ may both represent the same moiety.

In some embodiments, in general formula (I) $R^1$ and $R^2$ may both represent 2-ethylhexyl, isononyl, or 2-propylheptyl. In some embodiments, the compound of formula (I) may be di(2-ethylhexyl)-terephthalate.

In some embodiments, the thermoplastic polymer may be a polyvinylchloride (PVC), polyvinyl butyral (PVB), a homo- or co-polymer of styrene, polyacrylate, polysulfide, and/or a thermoplastic polyurethane (PU); for example, PVC.

In some embodiments, the plasticised polymer formulation may be in the form of a plastisol, for example in the form of a fluid or a paste comprising a polymer and the plasticiser composition, and optionally one or more additives.

In some embodiments, the citrate ester may be an alkyl ester of citric acid, or an acetyl alkyl citrate ester. In some embodiments, the citrate ester may be of general formula (II):

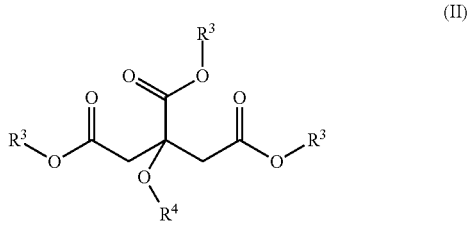

wherein $R^4$ represents a hydrogen atom or an $R^5C(O)$—moiety, and $R^3$ and $R^5$ each independently represent a straight or branched chain alkyl group having from four to eight carbon atoms, for example from six to eight carbon atoms. Examples of a suitable citrate ester include acetyl tributyl citrate, and/or acetyl trioctyl citrate.

In some embodiments, in general formula (II) $R^3$ and $R^5$ may each independently represent a methyl, ethyl, propyl, isopropyl, n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, isooctyl, and/or 2-ethylhexyl alkyl moiety.

In some embodiments, the relative proportions of plasticisers (a) and (b) in the plasticiser composition according to the invention may be adjusted to suit how the plasticiser composition is to be used. This can be achieved by routine experimentation, as would be well known to a person of skill in the art. In some embodiments, one or more third plasticisers (c) may be included in the plasticiser composition if it is necessary to impart further characteristics to the composition.

In some embodiments, the plasticiser composition may comprise more than 50% by weight of a first plasticiser. In some embodiments, the plasticiser composition may comprise from 50% to 80% by weight of a first plasticiser and from 20% to 50% by weight of a second plasticiser.

In some embodiments, the plasticiser composition may comprise (c) one or more third plasticisers. In some embodiments, the plasticiser composition may comprise a minor amount of a third plasticiser (c). In some embodiments, the plasticiser composition may comprise from 50% to 70% by weight of a first plasticiser (a), from 20% to 50% by weight of a second plasticiser (b), and from 0 to 25% by weight of a third plasticiser (c).

In some embodiments, the third plasticiser may be a dialkyl phthalate, alkyl aralkyl phthalate, dialkyl cyclohexan-1,2-dicarboxylate, dialkylcyclohexane-1,3-dicarboxylate, dialkyl cyclohexane-1,4-dicarboxylate, dialkyl terephthalate which differs from the compound of general formula (I), trialkyl trimellitate, alkyl benzoate, dibenzoic esters of glycol, hydroxybenzoic ester, ester of saturated monocarboxylic acid, ester of unsaturated monocarboxylic acid, ester of saturated dicarboxylic acid, ester of unsaturated dicarboxylic acid, amide and/or ester of aromatic sulfonic acid, alkylsulfonic ester, glycerol ester, isosorbide ester, phosphoric ester, alkylpyrrolidone derivative, dialkyl 2,5-furan-dicarboxylate, dialkyl 2,5-tetrahydrofurandicarboxylate, epoxidized vegetable oil, epoxidized fatty acid monoalkylester, and/or a polyester made of an aliphatic and/or aromatic polycarboxylic acid with at least a dihydric alcohol.

In some embodiments, a suitable dialkyl phthalate for use as the third plasticiser may have alkyl groups which each independently have from 4 to 13 carbon atoms, for example from 7 to 13 carbon atoms. An example of a suitable alkyl aralkyl phthalate is benzyl butyl phthalate. In some embodiments, a suitable dialkyl cyclohexan-1,2-dicarboxylate for use as the third plasticiser may have alkyl groups which each independently have from 4 to 13 carbon atoms, in particular from 7 to 11 carbon atoms. In some embodiments, a suitable dialkyl cyclohexane-1,3-dicarboxylate for use as the third plasticiser may have alkyl groups which each independently have 4 to 13 carbon atoms, for example from 8 to 13 carbon atoms. In some embodiments, a suitable dialkyl cyclohexane-1,4-dicarboxylate for use as the third plasticiser may have alkyl groups which each independently have from 4 to 13 carbon atoms, for example from 8 to 11 carbon atoms. An example of a suitable dialkyl cyclohexane-1,4-dicarboxylate is di-(2-ethylhexyl)-cyclohexane-1,4-dicarboxylate. In some embodiments, a suitable dialkyl terephthalate which differs from the compound of general formula (I) for use as the third plasticiser may have alkyl groups which each independently have from 3 to 6 carbon atoms, in particular from 4 to 6 carbon atoms. In some embodiments, a suitable trialkyl trimellitate for use as the third plasticiser may have alkyl groups which each independently have from 4 to 13 carbon atoms, in particular from 7 to 11 carbon atoms.

In some embodiments, a suitable alkyl benzoate for use as the third plasticiser may have alkyl groups which each independently have from 7 to 13 carbon atoms, in particular from 9 to 13 carbon atoms. An example of a suitable alkyl benzoate includes isononyl benzoate, isodecyl benzoate, and/or 2-propylheptyl benzoate. An example of a suitable dibenzoic ester of a glycol includes diethylene glycol dibenzoate, propylene glycol dibenzoate, dipropylene glycol dibenzoate, tripropylene glycol dibenzoate and/or dibutylene glycol dibenzoate. An example of a suitable ester of saturated monocarboxylic acid includes for example an ester of acetic acid, butyric acid, valeric acid, or lactic acid. An example of a suitable ester of unsaturated monocarboxylic acid includes for example an ester of acrylic acid. An example of a suitable ester of saturated dicarboxylic acid include an ester of succinic acid, glutaric acid, sebacic acid, malic acid, tartaric acid, or a dialkylester of 2-ethyl-succinic acid, 2-methylglutaric acid or adipic acid. In some embodiments, a suitable dialkylester of 2-ethyl-succinic acid, 2-methylglutaric acid or adipic acid for use as the third plasticiser may have alkyl groups which each independently have from 4 to 13 carbon atoms, in particular from 6 to 10 carbon atoms. An example of a suitable dialkyl ester of 2-ethyl-succinic acid includes 2-ethylsuccinic acid dicyclopentylester, 2-ethylsuccinic acid dicyclohexylester, and/or 2-ethylsuccinic acid dicycloheptylester. An example of a suitable dialkyl ester of 2-methylglutaric acid includes 2-methylglutaric acid dicyclopentylester, 2-methylglutaric acid dicyclohexylester, and/or 2-methylglutaric acid dicycloheptylester. An example of a suitable dialkyl adipate includes di-octyl adipate (DOA). In some embodiments, an ester of an unsaturated dicarboxylic acid may be an ester of maleic acid and/or of fumaric acid. In some embodiments, a suitable alkylsulfonic ester for use as the third plasticiser may have an alkyl moiety having from 8 to 22 carbon atoms;

for example, a phenyl and/or cresyl ester of pentadecylsulfonic acid. In some embodiments, a suitable isosorbide ester for use as the third plasticiser includes an isosorbide diester, for example esterified with a carboxylic acid having from 8 to 13 carbon atoms.

In some embodiments, a suitable phosphoric ester for use as the third plasticiser may be a tri-2-ethylhexyl phosphate, tert-butylphenyl diphenyl phosphate, trioctyl phosphate, triphenyl phosphate, isodecyl diphenyl phosphate, bis(2-ethylhexyl) phenyl phosphate, and 2-ethylhexyl diphenyl phosphate. In some embodiments, a suitable alkylpyrrolidone derivative for use as the third plasticiser may have an alkyl moiety of from 4 to 18 carbon atoms. In some embodiments, a suitable dialkyl 2,5-furan-dicarboxylate for use as the third plasticiser may have alkyl groups which each independently have from 4 to 13 carbon atoms, for example from 5 to 12 carbon atoms. In some embodiments, a suitable dialkyl 2,5-tetrahydrofuran-dicarboxylate for use as the third plasticiser may be alkyl groups which each independently have from 4 to 13 carbon atoms, for example from 5 to 12 carbon atoms. An example of a suitable epoxidized vegetable oil includes epoxidized soy oil or an epoxidized fatty acid monoalkylesters. In some embodiments, a suitable polyester for use as the third plasticiser may be an aliphatic and/or aromatic polycarboxylic acid such as a polyester of adipic acid with a polyhydric alcohol, in particular a dialkylene glycol polyadipate having from 2 to 6 carbon atoms in the alkylene moiety.

Where a third plasticiser is substituted by an alkyl moiety, that moiety may have a straight or branch chain.

In some embodiments, the plasticised polymer formulation or plastics article may comprise a thermoplastic polymer. In some embodiments, a suitable thermoplastic polymer may a thermoplastically processable polymer. In some embodiments, a thermoplastic polymer may be a homo- or copolymer which comprises at least one copolymerized monomer selected from $C_2$-$C_{10}$-monoolefin (such as ethylene or propylene), 1,3-butadiene, 2-chloro-1,3-butadiene, an ester of $C_2$-$C_{10}$-alkanoic acid with vinyl alcohol, vinyl chloride, vinylidene chloride, vinylidene fluoride, tetrafluoroethylene, glycidyl acrylate, glycidyl methacrylate, an acrylate and methacrylate of a branched or unbranched $C_1$-$C_{10}$-alcohol, a vinyl aromatic (such as styrene), (meth) acrylonitrile, maleic anhydride, and/or an $\alpha,\beta$-ethylenically unsaturated mono- and/or dicarboxylic acid; a homo- or copolymer of a vinyl acetal; a polyvinyl ester; a polycarbonate (PC); a polyester, such as polyalkylene terephthalate, polyhydroxyalkanoate (PHA), polybutylene succinate (PBS), polybutylene succinate adipate (PB SA); a polyether; a polyether ketone; a thermoplastic polyurethane (TPU); a polysulfide; and/or a polysulfones.

In some embodiments, a polyacrylate may have an identical or different alcohol moiety, for example an alcohol having from 4 to 8 carbon atoms, e.g. butanol, hexanol, octanol, and 2-ethylhexanol. In some embodiments, a suitable thermoplastic polymer may be polymethyl methacrylate (PMMA), methyl methacrylate-butyl acrylate copolymer, acrylonitrile-butadiene-styrene copolymer (ABS), ethylene-propylene copolymer, ethylene-propylene-diene copolymer (EPDM), polystyrene (PS), styrene-acrylonitrile copolymers (SAN), acrylonitrile-styrene-acrylate copolymer (ASA), styrene-butadiene-methyl methacrylate copolymer (SBMMA), styrene-maleic anhydride copolymer, styrene-methacrylic acid copolymer (SMA), polyoxymethylene (POM), polyvinyl alcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethylcellulose (EC), cellulose acetate (CA), cellulose propionate (CP), and cellulose acetate/butyrate (CAB).

In some embodiments, the thermoplastic polymer may be polyvinyl chloride (PVC), polyvinyl butyral (PVB), homo- and copolymers of vinyl acetate, homo- and copolymers of styrene, a polyacrylate, thermoplastic polyurethane (TPU), or a polysulfide.

In some embodiments, the thermoplastic polymer may be polyvinyl chloride (PVC). In some embodiments, polyvinyl chloride may be obtained via homopolymerization of vinyl chloride. The polyvinyl chloride (PVC) used in the plasticised polymer formulation and/or plastics article according to the invention may for example be produced via suspension polymerization, microsuspension polymerization, emulsion polymerization, or bulk polymerization.

In some embodiments, the K value which is generally characterizes the molar mass of PVC and is determined in accordance with DIN 53726, may be from 57 to 90 for PVC used as a thermoplastic polymer in the plasticised polymer formulation and/or plastics article according to the invention, for example from 61 to 85, particularly from 64 to 80.

In some embodiments, the formulation or plastics article according to the invention may additionally comprise a third plasticiser such as an adipate ester (such as di-octyladipate (DOA)), a dibenzoate ester (such as propylene glycol dibenzoate, or 1,2-Benzenedicarboxylic acid, benzyl C7-9-branched and linear alkyl esters), a polyol ester (such as 2,2-bis[[(1-oxopentyl)oxy]methyl]propane-1,3-diyl divalerate), a phosphate ester (such as tert-butylphenyl diphenyl phosphate), an epoxy ester (such as an epoxidized stearate ester), and/or an alkyl pyrrolidone (such as 1-lauryl-2-pyrrolidone).

In some embodiments, the use of DOTP and a citrate ester may comprise use of DOTP, a citrate ester, and a third plasticiser.

In some embodiments, the formulation or plastics article according to the invention may additionally comprise a Ca/Zn or Ba/Zn stabiliser, a fire retardant, a pigment, a dye, a mineral filler, an organic filler, a lubricant, a UV stabiliser, a biocide, a flow aid (such as fumed silica), an anti-oxidant, and/or a further stabiliser. In some embodiments, the formulation or plastics article according to the invention may further comprise one or more of a biocide, a flow aid (such as fumed silica), filler (which may be a mineral filler or organic filler), a stabilizer, an epoxidized vegetable oil, an antistatic agent, a fire retardant, a dye, a pigment, a lubricant, a viscosity reducer, a blowing agent, a liquid kicker, and/or a processing aid. In some embodiments, the formulation may further comprise up to 250 parts by weight of a filler, up to 7 parts by weight of a stabilizer, up to 5 parts by weight of an epoxidized vegetable oil and up to 100 parts by weight of a further component which is a biocide, a flow aid, an antistatic agent, a fire retardant, a dye, a pigment, a lubricant, a viscosity reducer, a blowing agent, a liquid kicker, and/or a processing aid.

In some embodiments, a filler may be calcium oxide, magnesium oxide, titanium oxide, zinc oxide, calcium carbonate, clays, calcium silicate, talc, calcium sulphate, alumino-silicates, dolomite, bauxite, silica, diatomaceous earth and/or a molecular sieve.

In some embodiments, a stabilizer may be a benzotriazole and/or benzophenone compound to reduce the degradation by sunlight; a stabilizer to provide stability during heat processing which may be a metal compound, for example a lead salt, organotin compound, barium, barium/zinc, a cadmium and/or zinc salt and/or a calcium/zinc stabiliser.

In some embodiments, an epoxidized vegetable oil may be an epoxidized sunflower oil, linseed oil, corn oil rubber seed oil, soya bean oil, neem oil and/or mee oil. In some embodiments, an epoxidized vegetable oil may be mixed into the formulation with the plasticisers to provide heat and light stability.

In some embodiments, a viscosity reducing agent may be an aliphatic hydrocarbon (for example Viscobyk® 4010, 4013, 4015 and 4040), a carboxylic acid derivate (for example Viscobyk®5025, 5125 and 5050, Jayflex® 615 or Exxsol® D100), dodecyl benzene (for example Jayflex® 602), a specialty ester based on an oleate and/or laurate, 2,2,4-trimethylpentanediol diisobutyrate, a C3-C17 ester of 1,2,4-trimethyl-1,3-pentanediol, and/or a C3-C17 ester of 1,2,4-trimethyl-1,3-pentanediol monoisobutyrate.

In some embodiments, a blowing agent may be an azobisisobutyronitrile, toluenesulfonylhydrazide, azodicarbonamide, oxybisbenzenesulfonyl-hydrazide, sodium bicarbonate and citric acid which releases a gas (for example nitrogen and carbon dioxide) and water when heated.

In some embodiments, a kicker may be a lead compound (for example dibasic lead phthalate), zinc oxide and/or a barium/cadmium compound. An advantage of using a kicker is that it can control and lower the decomposition temperature of the blowing agent.

In some embodiments, an antistatic agent may be cationic, non-ionic or anionic. In some embodiments, the antistatic agent may be an amide, amine, a quaternary ammonium compound, a polyalkylene glycol derivative, a sulphate, a sulphonate, an ether and/or an ester. Suitable examples of an antistatic agent include lauramidopropyl-trimethylammonium methosulfate, myristamidopropyl-trimethylammonium methosulfate, stearamidopropyl-trimethylammonium methosulfate, and/or stearamidopropyl-dimethyl-beta-hydroxy-ethylammonium dihydrogen phosphate. An advantage of using an antistatic agent is that it can reduce build-up of a static charge and may promote charge dissipation.

In some embodiments, a fire retardant may be a halogen-containing compound, a phosphorous-containing organic compound (for example a triaryl, trialkyl or alkyl diaryl phosphate ester), a chloroparaffin, aluminum trihydrate and/or an antimony oxide. An advantage of using a fire retardant is that it may increase ignition time as well as reduce flame spreading and rate of burning.

In some embodiments, a pigment or dye may be a metallic oxide (for example iron oxide), a metal hydroxide, a metal powder, sulphide, sulphate, carbonate, a silicate (for example an ammoniumsilicate), carbon black, china clay, baryte, iron blue, lead blue, organic red, and/or organic maroon.

In some embodiments, a lubricant and/or processing aid may include stearic acid, a metal stearate, a petroleum wax, silicon oil, mineral oil, synthetic oil and/or polyethylene wax.

In some embodiments, a plastics article according to the invention may be a floor covering, a wall covering, wall paper, a decorative film (e.g. for use in furniture manufacture), a pipe or tubing, a sheet (such as a tarpaulin, foil, tape, sheet, film, or a membrane), roofing, a bag (such as a blood bag), an article of clothing such as a part of a shoe, guttering, and/or a coating (for example for fabric, a wire or a cable).

The invention will now be illustrated with reference to the following Examples which are not intended to limit the scope of the claimed invention.

PREPARATION EXAMPLE 1

The plasticiser formulations tested in Examples 2 and 3, and Comparative Examples 4, 5, and 6 were prepared as follows.

The ingredients listed in Table 1 below were weighed in the proportions indicated to a 1 litre steel vessel and mixed by hand using a palette knife until the solid components were fully wetted by the liquids. They were then mixed for a further 6 minutes at 1800 rpm in a PC Labor system LDV1A dispersion mixer. The additional additives included a stabiliser.

TABLE 1

| Ingredient | Amount (parts per hundred parts resin) |
|---|---|
| PVC | 100 |
| First plasticiser | 30 |
| Second plasticiser | 10 |
| Mineral Filler | 31.5 |
| Additives | 2 |

EXAMPLE 2

A plasticiser formulation comprising PVC, a first plasticiser which is DOTP (marketed as Eastman 168 (registered trademark)), and a second plasticiser which is a mixture of acetyl tributyl citrate ester and acetyl trioctyl citrate ester (marketed as Citrofol D90 (registered Trademark) was prepared and was stored for five weeks at different temperatures, as indicated in Table 2. The viscosity of the formulation was measured using a Brookfield RVT Viscometer (spindle RV5, 5 rpm) and recording in mPa·s at the intervals indicated in Table 2. The viscosity increase in Table 2 is calculated from the viscosity at the recorded time divided by that recorded on the first day.

TABLE 2

| | Viscosity increase at specified storage temperature/mPa · s | | |
|---|---|---|---|
| No. of days | Ambient temperature | 30° C. | 10° C. |
| 0 | 100% | 100% | 100% |
| 1 | 169% | 117% | 194% |
| 2 | 165% | 115% | 197% |
| 3 | 153% | 121% | 199% |
| 7 | 180% | 150% | 289% |
| 14 | 169% | 173% | 211% |
| 35 | 170% | 216% | 198% |

The data surprisingly shows that the formulation according to the invention has a relatively low viscosity increase at low, ambient and high temperatures over a five week period as the viscosity stays within 300% of the original viscosity.

EXAMPLE 3

A plasticiser formulation comprising PVC, a first plasticiser which is DOTP (Eastman 168), and a second plasticiser which is acetyl tributyl citrate ester (which is marketed as Citrofol B2 (registered trademark)) was prepared and was stored for five weeks at different temperatures, as indicated in Table 3. The viscosity of the formulation was measured at the intervals indicated in Table 3.

TABLE 3

| | Viscosity increase at specified storage temperature | | |
|---|---|---|---|
| No. of days | Ambient temperature | 30° C. | 10° C. |
| 0 | 100% | 100% | 100% |
| 1 | 150% | 111% | 242% |
| 2 | 160% | 106% | 242% |
| 3 | 142% | 133% | 258% |
| 7 | 176% | 163% | 259% |
| 14 | 161% | 196% | 269% |
| 35 | 171% | 205% | 250% |

The data shows that the formulation has a relatively low viscosity increase at low, ambient and high temperatures as the viscosity stays within 300% of the original viscosity.

TEST EXAMPLE 4

The gelation speed of the plasticiser formulations according to the invention which are exemplified in Examples 2 and 3 was measured as follows.

The PVC plastisol for each Example was placed in a rheometer (Anton Paar MCR 302, PP25 plate, gap setting 1 mm). The plastisol was heated at a rate of 2° C./min, and its viscosity was measured as the temperature of the plastisol was increased. The gelation speed is determined by the inflection point temperature in the resulting temperature/viscosity curve (calculated using Anton Paar Rheocompass software). Results are given in Table 4 where a lower temperature indicates a faster gelation speed.

TABLE 4

| Example | Inflection point (° C.) |
|---|---|
| 2 | 81.3 |
| 3 | 85.5 |

The data shows that the formulations according to the invention have an acceptable inflection point of lower than 90° C. such that they are suitable for use in an industrial production line. Experience with formulations commonly used in the production of floor covering shows that below this point a plastisol can be successfully processed without excessive processing temperatures or dwell times for reasons of energy efficiency and optimising production capacity. Formulations based on DINP with a fast-fusing secondary plasticiser have gelation temperatures measured by this method of around 80° C. and values close to this point are desirable.

COMPARATIVE EXAMPLE 5

A first comparative plasticiser formulation comprising PVC, a first plasticiser which is DOTP (Eastman 168), and a second plasticiser which is a propylene glycol dibenzoate ester (marketed as K-Flex PG (registered trademark)) was prepared and was stored for five weeks at different temperatures, as indicated in Table 5. The viscosity of the formulation was measured at the intervals indicated in Table 5.

TABLE 5

| | Viscosity increase at specified storage temperature | | |
|---|---|---|---|
| No. of days | Ambient temperature | 30° C. | 10° C. |
| 0 | 100% | 100% | 100% |
| 1 | 168% | 178% | 288% |
| 2 | 178% | 233% | 282% |
| 3 | 161% | 264% | 282% |
| 7 | 181% | 355% | 270% |
| 14 | 200% | 355% | 275% |
| 35 | 204% | 355% | 276% |

The data shows that the first comparative formulation has a relatively low viscosity increase at low and ambient temperatures as the viscosity stays within 300% of the original viscosity. However, at a high temperature, the viscosity increase is at an unacceptable level over 300% of the original viscosity after seven days which would mean that the formulation would not be suitable for summer use. It is not practical to have different formulations for different times of year due to the unpredictability of the weather and because of the difficulty of matching the properties of different formulations.

COMPARATIVE EXAMPLE 6

A plasticiser formulation comprising PVC, a first plasticiser which is DINCH, and a second plasticiser which is the blend of acetyl trioctyl citrate ester and acetyl tributyl citrate ester (Citrofol D90) was prepared and was stored for five weeks at different temperatures, as indicated in Table 6. The viscosity of the formulation was measured at the intervals indicated in Table 6.

TABLE 6

| | Viscosity increase at specified storage temperature | | |
|---|---|---|---|
| No. of days | Ambient temperature | 30° C. | 10° C. |
| 0 | 100% | 100% | 100% |
| 1 | 134% | 166% | 182% |
| 2 | 138% | 177% | 185% |
| 3 | 148% | 201% | 191% |
| 7 | 168% | 280% | 194% |
| 14 | 199% | 321% | 193% |
| 35 | 229% | 426% | 326% |

The data shows that the formulation has a relatively low viscosity increase at an ambient temperature but an unacceptably high increase in viscosity at low (10° C.) and high (30° C.) temperatures as the viscosity is over 300% of the original viscosity, even over 400% of the original viscosity.

COMPARATIVE EXAMPLE 7

A plasticiser formulation comprising PVC, a first plasticiser which is DINCH, and a second plasticiser which is acetyl tributyl citrate ester (Citrofol B2) was prepared and was stored for five weeks at different temperatures, as indicated in Table 7. The viscosity of the formulation was measured at the intervals indicated in Table 7.

TABLE 7

| | Viscosity increase at specified storage temperature | | |
|---|---|---|---|
| No. of days | Ambient temperature | 30° C. | 10° C. |
| 0 | 100% | 100% | 100% |
| 1 | 136% | 281% | 194% |
| 2 | 143% | 298% | 206% |
| 3 | 153% | 368% | 210% |
| 7 | 161% | 490% | 208% |
| 14 | 208% | 617% | 235% |
| 35 | 261% | 694% | 348% |

The data shows that the formulation has a relatively low increase in viscosity at an ambient temperature but an unacceptably high increase in viscosity at low (10° C.) and high (30° C.) temperatures as the increase in viscosity is over 300% of the original viscosity, even over 600% of the original viscosity.

COMPARATIVE EXAMPLE 8

A comparative plasticiser formulation comprising PVC, a first plasticiser which is DOTP (Eastman 168), and a second plasticiser which is tert-butylphenyl diphenyl phosphate (marketed as Santicizer S1535 (registered trademark)) was prepared and was stored for five weeks at different temperatures, as indicated in Table 8. The viscosity of the formulation was measured at the intervals indicated in Table 8.

TABLE 8

| | Viscosity increase at specified storage temperature | | |
|---|---|---|---|
| No. of days | Ambient temperature | 30° C. | 10° C. |
| 0 | 100% | 100% | 100% |
| 1 | 186% | 187% | 239% |
| 2 | 185% | 266% | 240% |
| 3 | 190% | 306% | 240% |
| 7 | 230% | 373% | 232% |
| 14 | 248% | 373% | 239% |
| 35 | 295% | 373% | 244% |

The data shows that the first comparative formulation has a relatively low viscosity increase at low and ambient temperatures as the viscosity stays within 300% of the original viscosity. However, at a high temperature, the viscosity increase is at an unacceptable level over 300% of the original viscosity after three days which would mean that the formulation would not be suitable for summer use. It is not practical to have different formulations for different times of year due to the unpredictability of the weather and because of the difficulty of matching the properties of different formulations.

COMPARATIVE EXAMPLE 9

A first comparative plasticiser formulation comprising PVC, a first plasticiser which is DOTP (Eastman 168), and a second plasticiser which is isodecyl diphenyl phosphate (marketed as Santicizer S148 (registered trademark)) was prepared and was stored for five weeks at different temperatures, as indicated in Table 9. The viscosity of the formulation was measured at the intervals indicated in Table 9.

TABLE 9

| | Viscosity increase at specified storage temperature | | |
|---|---|---|---|
| No. of days | Ambient temperature | 30° C. | 10° C. |
| 0 | 100% | 100% | 100% |
| 1 | 165% | 269% | 224% |
| 2 | 179% | 357% | 221% |
| 3 | 183% | 374% | 225% |
| 7 | 200% | 488% | 224% |
| 14 | 216% | 488% | 236% |
| 35 | 291% | 488% | 240% |

The data shows that the first comparative formulation has a relatively low viscosity increase at low and ambient temperatures as the viscosity stays within 300% of the original viscosity. However, at a high temperature, the viscosity increase is at an unacceptable level over 300% of the original viscosity after two days which would mean that the formulation would not be suitable for summer use. It is not practical to have different formulations for different times of year due to the unpredictability of the weather and because of the difficulty of matching the properties of different formulations.

COMPARATIVE TEST EXAMPLE 10

The gelation speed of the comparative plasticiser formulations which are exemplified in Comparative Examples 5 to 9 was measured as described in Test Example 4 and the results are shown in Table 10.

TABLE 10

| Comparative Example | Inflection point (° C.) |
|---|---|
| 5 | 77.44 |
| 6 | 86.52 |
| 7 | 83.33 |
| 8 | 78.74 |
| 9 | 79.81 |

(c) The data shows that the comparative formulations have an acceptable inflection point of lower than 90° C. such that they are suitable for use in an industrial production line.

The invention claimed is:

1. A plasticiser composition which consists of:
(a) a first plasticiser which is one or more compounds of general formula (I)

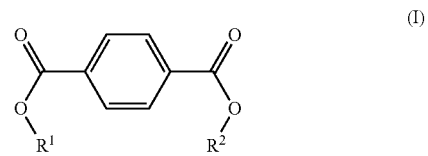

(I)

wherein $R^1$ and $R^2$ each independently represent a straight or branched chain alkyl moiety comprising from seven to twelve carbon atoms; and (b) a second plasticiser which is a citrate ester of general formula (II):

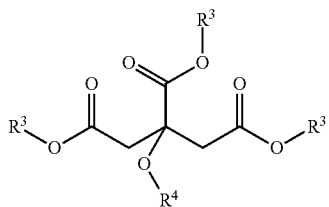

wherein R⁴ represents an R⁵C(O)-moiety, each R³ independently represents a straight or branched chain alkyl moiety having from four to eight carbon atoms, and R⁵ represents a methyl, ethyl, propyl, isopropyl, n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, isooctyl, and/or 2-ethylhexyl alkyl moiety; and optionally (c) a third plasticiser which is dialkyl phthalate, alkyl aralkyl phthalate, dialkyl cyclohexan-1,2-dicarboxylate, dialkyl cyclohexane-1,3-dicarboxylate, dialkyl cyclohexane-1,4-dicarboxylate, dialkyl terephthalate which differs from the compound of general formula (I), trialkyl trimellitate, alkyl benzoate, dibenzoic esters of glycol, hydroxybenzoic ester, ester of saturated monocarboxylic acid, ester of unsaturated monocarboxylic acid, ester of saturated dicarboxylic acid, ester of unsaturated dicarboxylic acid, amide and/or ester of aromatic sulfonic acid, alkylsulfonic ester, glycerol ester, isosorbide ester, phosphoric ester, alkylpyrrolidone derivative, dialkyl 2,5-furan-dicarboxylate, dialkyl 2,5-tetrahydrofurandicarboxylate, and/or a polyester made of an aliphatic and/or aromatic polycarboxylic acid with at least a dihydric alcohol.

2. A plasticiser composition as defined in claim 1 wherein in general formula (I) R¹ and R² each independently represent a straight or branched chain alkyl moiety comprising from seven to nine carbon atoms.

3. A plasticiser composition as defined in claim 1 wherein in general formula (I) R¹ and R² both represent 2-ethylhexyl, isononyl, or 2-propylheptyl.

4. A plasticiser composition as defined in claim 1 wherein in general formula (I) R¹ and R² each independently represent a straight or branched chain alkyl moiety comprising eight carbon atoms.

5. A plasticiser composition as defined in claim 1 wherein in general formula (I) R¹ and R² each represent a 2-ethylhexyl alkyl moiety.

6. A plasticiser composition as defined in claim 1 wherein the citrate ester is an alkyl ester of citric acid, or an acetyl alkyl citrate ester.

7. A plasticiser composition as defined in claim 1 wherein R⁵ represents a straight or branched chain alkyl moiety having from four to eight carbon atoms.

8. A plasticiser composition as defined in claim 7 wherein R³ and R⁵ each independently represent a straight or branched chain alkyl moiety having from six to eight carbon atoms.

9. A plasticiser composition as defined in claim 1 wherein the citrate ester is acetyl tributyl citrate, and/or acetyl trioctyl citrate.

10. A plasticiser composition as defined in claim 1 which comprises more than 50% by weight of a first plasticiser.

11. A plasticiser composition as defined in claim 1 wherein the plasticiser composition comprises from 50% to 80% by weight of a first plasticiser and from 20% to 50% by weight of a second plasticiser.

12. A plasticiser composition as defined in claim 1 wherein the third plasticiser is a dialkyl adipate.

13. A plasticiser composition as defined in claim 1 which comprises from 50% to 70% by weight of a first plasticiser (a), from 20% to 50% by weight of a second plasticiser (b), and from 0 to 10% by weight of a third plasticiser (c).

14. A plasticised polymer formulation which comprises a polymer and a plasticiser composition which consists of:
(a) a first plasticiser which is one or more compounds of general formula (I)

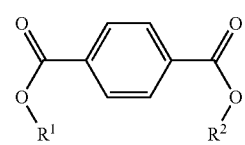

wherein R¹ and R² each independently represent a straight or branched chain alkyl moiety comprising from seven to twelve carbon atoms; and
(b) a second plasticiser which is a citrate ester of general formula (II):

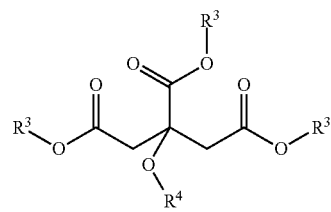

wherein R⁴ represents an R⁵C(O)-moiety, each R³ independently represents a straight or branched chain alkyl moiety having from four to eight carbon atoms, and R⁵ represents a methyl, ethyl, propyl, isopropyl, n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, isooctyl, and/or 2-ethylhexyl alkyl moiety; and optionally (c) a third plasticiser which is dialkyl phthalate, alkyl aralkyl phthalate, dialkyl cyclohexan-1,2-dicarboxylate, dialkyl cyclohexane-1,3-dicarboxylate, dialkyl cyclohexane-1,4-dicarboxylate, dialkyl terephthalate which differs from the compound of general formula (I), trialkyl trimellitate, alkyl benzoate, dibenzoic esters of glycol, hydroxybenzoic ester, ester of saturated monocarboxylic acid, ester of unsaturated monocarboxylic acid, ester of saturated dicarboxylic acid, ester of unsaturated dicarboxylic acid, amide and/or ester of aromatic sulfonic acid, alkylsulfonic ester, glycerol ester, isosorbide ester, phosphoric ester, alkylpyrrolidone derivative, dialkyl 2,5-furan-dicarboxylate, dialkyl 2,5-tetrahydrofurandicarboxylate, and/or a polyester made of an aliphatic and/or aromatic polycarboxylic acid with at least a dihydric alcohol.

15. A plasticised polymer formulation as defined in claim 14 wherein the polymer is a thermoplastic polymer.

16. A plasticised polymer formulation as defined in claim 14 wherein the polymer is a polyvinylchloride (PVC), polyvinyl butyral (PVB), a homo- or co-polymer of styrene, polyacrylate, polysulfide, and/or a thermoplastic polyurethane (PU).

17. A plasticised polymer formulation as defined in claim 14 wherein the polymer is PVC.

18. A plasticised polymer formulation as defined in claim 14 which is in the form of a plastisol.

19. A plastics article which is formed from a plasticised polymer formulation as defined in claim 14.

20. A plastics article as defined in claim 19 which is a floor covering, a wall covering, wall paper, a decorative film, a pipe or tubing, a sheet, roofing, a bag, an article of clothing, guttering, and/or a coating.

21. A method of preparing a polymer composition which method comprises a step of mixing a polymer with a plasticiser composition wherein the plasticiser composition consists of:
(a) a first plasticiser which is one or more compounds of general formula (I)

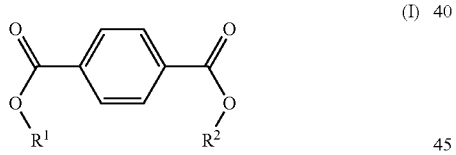

(I)

wherein $R^1$ and $R^2$ each independently represent a straight or branched chain alkyl moiety comprising from seven to twelve carbon atoms; and (b) a second plasticiser which is a citrate ester of general formula (II):

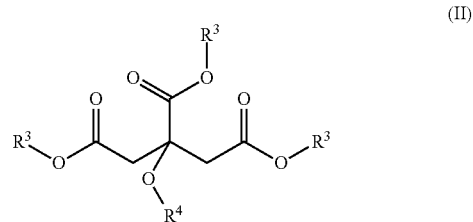

(II)

wherein $R^4$ represents an $R^5C(O)$-moiety, each $R^3$ independently represents a straight or branched chain alkyl moiety having from four to eight carbon atoms, and $R^5$ represents a methyl, ethyl, propyl, isopropyl, n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, isooctyl, and/or 2-ethylhexyl alkyl moiety; and optionally (c) a third plasticiser which is dialkyl phthalate, alkyl aralkyl phthalate, dialkyl cyclohexan-1,2-dicarboxylate, dialkyl cyclohexane-1,3-dicarboxylate, dialkyl cyclohexane-1,4-dicarboxylate, dialkyl terephthalate which differs from the compound of general formula (I), trialkyl trimellitate, alkyl benzoate, dibenzoic esters of glycol, hydroxybenzoic ester, ester of saturated monocarboxylic acid, ester of unsaturated monocarboxylic acid, ester of saturated dicarboxylic acid, ester of unsaturated dicarboxylic acid, amide and/or ester of aromatic sulfonic acid, alkylsulfonic ester, glycerol ester, isosorbide ester, phosphoric ester, alkylpyrrolidone derivative, dialkyl 2,5-furan-dicarboxylate, dialkyl 2,5-tetrahydrofurandicarboxylate, and/or a polyester made of an aliphatic and/or aromatic polycarboxylic acid with at least a dihydric alcohol;

wherein the plasticised polymeric formulation can be stored for up to five weeks with an increase of viscosity of less than 300%.

* * * * *